(12) United States Patent
Nielsen

(10) Patent No.: US 10,913,230 B2
(45) Date of Patent: Feb. 9, 2021

(54) METHOD OF MOLDING A SHELL PART OF A WIND TURBINE BLADE

(71) Applicant: LM WP PATENT HOLDING A/S, Kolding (DK)

(72) Inventor: Lars Nielsen, Skanderborg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 336 days.

(21) Appl. No.: 16/067,941

(22) PCT Filed: Jan. 3, 2017

(86) PCT No.: PCT/EP2017/050089
§ 371 (c)(1),
(2) Date: Jul. 3, 2018

(87) PCT Pub. No.: WO2017/118635
PCT Pub. Date: Jul. 13, 2017

(65) Prior Publication Data
US 2020/0269536 A1    Aug. 27, 2020

(30) Foreign Application Priority Data

Jan. 5, 2016   (EP) ..................................... 16150220

(51) Int. Cl.
*B29D 99/00*    (2010.01)
*B29C 70/54*    (2006.01)
*B29L 31/08*    (2006.01)

(52) U.S. Cl.
CPC ........ *B29D 99/0028* (2013.01); *B29C 70/541* (2013.01); *B29C 70/543* (2013.01); *B29L 2031/085* (2013.01)

(58) Field of Classification Search
CPC ............ B29D 99/0028; B29D 99/0025; B29C 70/541; B29C 70/543; B29L 2031/085
See application file for complete search history.

(56) References Cited

U.S. PATENT DOCUMENTS

2012/0292439 A1* 11/2012 Hallander .............. B64D 45/02
   244/1 A
2013/0312900 A1* 11/2013 Austinat ............... B29C 33/306
   156/245

(Continued)

FOREIGN PATENT DOCUMENTS

CN     104552994 A    4/2015
EP      2666615 A1   11/2013

(Continued)

OTHER PUBLICATIONS

Extended European Search Report dated Jul. 25, 2016 in corresponding European Patent Application No. 16150220.8.

*Primary Examiner* — Igor Kershteyn
(74) *Attorney, Agent, or Firm* — Nath, Goldberg & Meyer; Jerald L. Meyer; Tanya E. Harkins

(57) ABSTRACT

The present invention relates to a method of molding a shell part of a wind turbine blade. The method involves attaching one or more fastening elements (63) onto a molding surface, each fastening element (63) comprising a support layer (64) with an upper face (66) and a lower face (68), and one or more spikes protruding from the upper face of the support layer (64). Fiber plies are then successively laid out into the molding cavity (78) such that each ply is anchored to one or more of said spikes. The fiber plies are then contacted with a polymer material to produce a shell part comprising a fiber reinforced composite material. The invention also relates to a shell part of a wind turbine blade obtainable by the method and to a fastening element for use in said method.

19 Claims, 4 Drawing Sheets

(56) References Cited

U.S. PATENT DOCUMENTS

Figure 1:
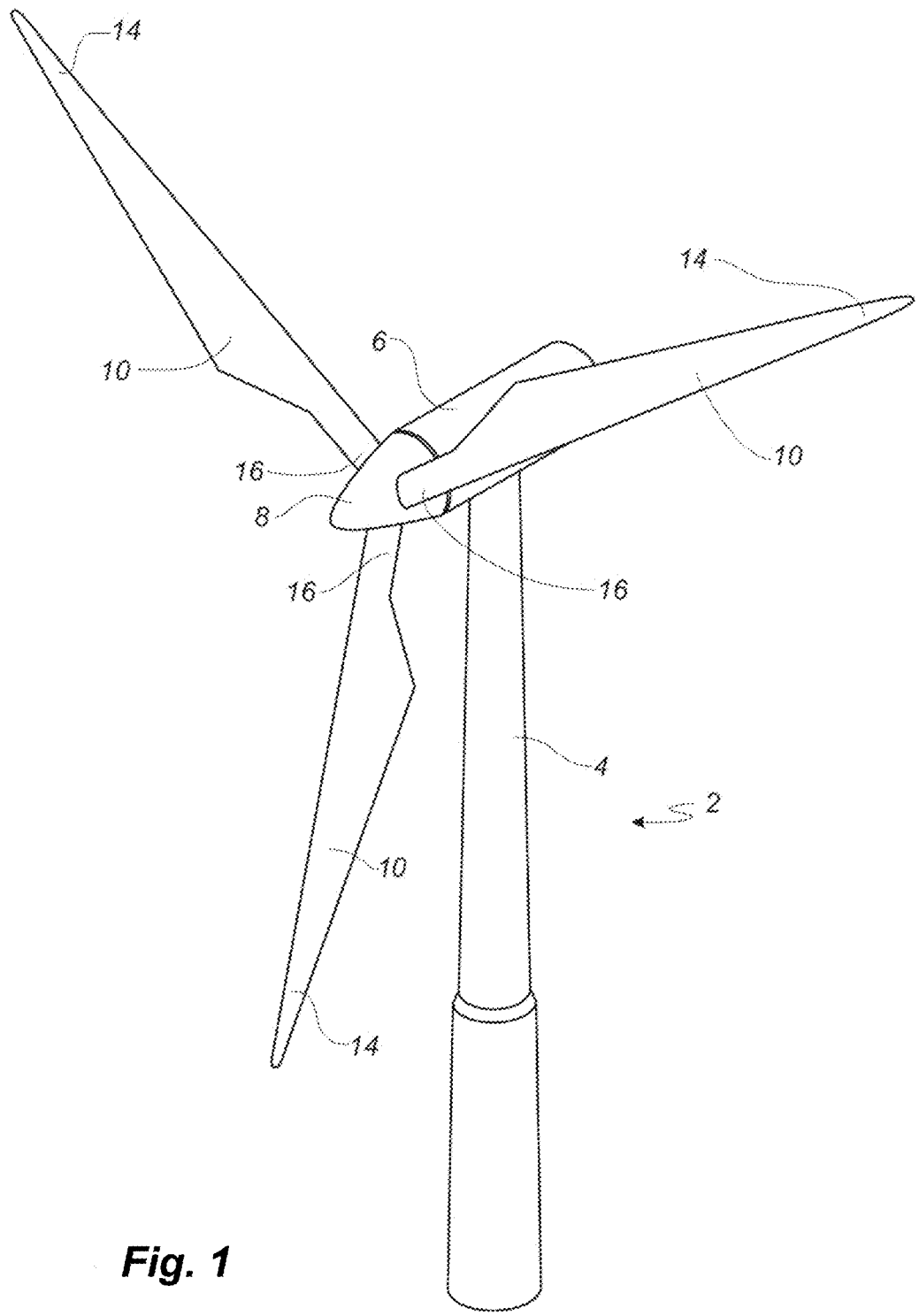

| | | | | |
|---|---|---|---|---|
| 2014/0348651 A1* | 11/2014 | Jensen | ............... | F03D 1/0675 |
| | | | | 416/1 |
| 2015/0298403 A1* | 10/2015 | Hedges | ............... | B66C 19/00 |
| | | | | 156/222 |
| 2015/0308402 A1* | 10/2015 | Nielsen | ............... | B29C 66/61 |
| | | | | 416/229 R |
| 2015/0308404 A1* | 10/2015 | Dahl | .................. | B29C 70/543 |
| | | | | 416/230 |
| 2017/0001387 A1* | 1/2017 | Ostergaard | ......... | B29D 99/0025 |
| 2017/0165923 A1* | 6/2017 | Chen | ....................... | B32B 5/06 |
| 2018/0154593 A1* | 6/2018 | Hunter | ................. | B29C 70/54 |

FOREIGN PATENT DOCUMENTS

| | | | |
|---|---|---|---|
| EP | 2783840 | A1 | 10/2014 |
| WO | 2009/155920 | A1 | 12/2009 |
| WO | 2011/087413 | A1 | 7/2011 |
| WO | 2014/094789 | A1 | 6/2014 |

\* cited by examiner

METHOD OF MOLDING A SHELL PART OF A WIND TURBINE BLADE

This is a National Phase Application filed under 35 U.S.C. 371 as a national stage of PCT/EP2017/050089, filed Jan. 3, 2017, an application claiming the benefit of European Application No. 16150220.8, filed Jan. 5, 2016, the content of each of which is hereby incorporated by reference in its entirety.

FIELD OF THE INVENTION

The present invention relates to a method of molding a shell part of a wind turbine blade, to a shell part of a wind turbine blade obtainable by the method, and to a fastening element for use in said method.

BACKGROUND OF THE INVENTION

Wind power is becoming increasingly popular due to its clean and environmentally friendly production of energy. The rotor blades of modern wind turbines capture kinetic wind energy by using sophisticated blade design created to maximize efficiency. Turbine blades may today exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

The shell halves of wind turbine blades are usually manufactured using molds. First, a blade gelcoat or primer is applied to the mold. Subsequently, fibre reinforcement and/or fabrics are placed into the mold followed by resin infusion. A vacuum is typically used to draw resin material, e.g. in form of epoxy, polyester or vinylester, into a mold. Alternatively, prepreg technology can be used in which a fibre or fabric pre-impregnated with resin forms a homogenous material which can be introduced into the mold. Several other molding techniques are known for manufacturing wind turbine blades, including compression molding and resin transfer molding. The shell halves are assembled by being glued or bolted together substantially along a chord plane of the blade. The root region of each shell half typically has a circular cross section.

In vacuum assisted resin transfer molding (VARTM), glass fiber plies are placed in a mold with the correct orientation and subsequently resin is forced to flow through the fibers using a vacuum pump. This is usually followed by a curing cycle at atmospheric pressure.

A typical molding process includes bagging, resin infusion and subsequent curing. Bagging involves placing a vacuum foil on the fibre plies that have been laid up on the tool. The vacuum foil is used to press this part to the tool and to allow a vacuum to be drawn into the void formed by the bag and the tool such that the fibers of the part are infused with resin. Typical vacuum foils may be formed by one or more plastic sheets which are placed to cover the blade. Infusion comprises feeding resin under a vacuum to wet the laid out fibers to form a solid shell part. In subsequent curing, heating and subsequently cooling may be applied to harden the resin.

When manufacturing large blades, in particular the glass fiber layup at the root end becomes critical. Glass fiber plies have a tendency to slide down the vertical shell mold walls. This is can pose severe problems in view of limited widths of glass fibre plies and the resulting lack of support in other locations of the mold. This may result in sliding glass fibre plies during manufacturing, typically leading to the formation of undesired wrinkles in the shell structure, which may present zones of structural weakness within the blade.

Known methods for overcoming this type of problems include stitching techniques and the use of tackifiers. Stitching essentially ties the glass fiber plies together and to the mold edge railing. This creates local attachment points that might prevent the overall ply from sliding, but may also result in local wrinkle formation and misalignments due to the stitching pattern. Also, the stitching threads must be cut at some point outside the vacuum foil to achieve full vacuum. This may present further difficulties since the positioning of the glass fiber plies underneath the foil may have to be corrected after the threads are cut, while the plies are no longer free to move.

The use of tackifiers involves one or more adhesives that are applied between the plies for ensuring that sliding between plies is limited. However, some of these adhesives substances are known to have a negative effect on the mechanical properties of the resulting laminate.

It is therefore an object of the present invention to overcome the above-discussed drawbacks of the known methods.

It is another object of the present invention to provide a method for molding a shell part of a wind turbine blade that is simple and cost-effective.

In particular, it is an object of the present invention to provide a method for molding a shell part of a wind turbine blade that results in less wrinkle formation and better structural stability of the resulting blade than prior art methods.

SUMMARY OF THE INVENTION

In a first aspect, the present invention relates to a method of molding a shell part of a wind turbine blade, the blade having a profiled contour including a pressure side and a suction side, and a leading edge and a trailing edge with a chord having a chord length extending therebetween, the wind turbine blade extending in a spanwise direction between a root end and a tip end, said method comprising:
   a) providing a mold structure having a molding cavity with a molding surface, the molding cavity having a root end and an opposing tip end,
   b) attaching one or more fastening elements onto said molding surface, each fastening element comprising a support layer with an upper face and a lower face, and one or more spikes protruding from the upper face of the support layer, each spike comprising a spike tip,
   c) successively laying out one or more fiber plies into the molding cavity such that each ply is anchored to one or more of said spikes,
   d) contacting said one or more fiber plies with a polymer material, and optionally curing said polymer material, to produce a shell part comprising a fiber reinforced composite material.

This was found to be a surprisingly simple and efficient solution for significantly diminishing the formation of wrinkles in the shell part structure and to prevent ply sagging, in particular towards the root end of the molding cavity.

Typically, the shell part will be a shell half, e.g. a pressure side or upwind side shell part or a suction side or downwind side shell part. Also, the molding cavity with the molding surface will typically have a shape which is complementary to a shell half. In such molding cavity, the root end will usually correspond to the shape of the root end of the blade half, while the tip end of the cavity will usually correspond to the shape of the tip end of the blade half. The root end of such molding cavity will usually have a substantially semi-circular cross section. The molding surface may include the mold edge railing.

The fastening elements can be attached to the molding surface by adhesion or other reversible attachment methods such as screwing or bolting. In a preferred embodiment, each fastening element will comprise a plurality of spikes, such as more than five spikes, more than ten spikes, or more than 15 spikes. Usually, the spikes will be spaced regularly on the support layer, for example in multiple rows, each row being spaced to the next row by an equal distance, and each spike in a given row being spaced from its adjacent spike in that row by an equal distance. In one embodiment, the support layer is made from a plastic material.

The fiber plies are successively laid out into the molding cavity, preferably forming a stack of fiber plies, such that each ply is anchored to one or more of the spikes. Thus, the spike length advantageously exceeds the thickness of the stacked fiber plies. Anchoring will typically include penetration of the fiber plies by the one or more spikes. In one embodiment, each fiber ply comprises fibers, preferably glass fibers. In another embodiment, each fiber ply consists of fibers, preferably including glass fibers or consisting of glass fibers. Also other materials such as balsa wood can be laid out into the molding cavity and anchored to one or more spikes.

The polymer material, such as a thermosetting resin, is typically drawn into the mold to contact the fiber plies, also called wetting or infusion. In a preferred embodiment, the fiber plies are contacted with the polymer material in a vacuum-assisted method, e.g. vacuum assisted resin transfer molding (VARTM).

Preferably, the method further comprises a step of placing one or more protective elements on top of the uppermost fiber ply subsequent to step c), but prior to step d), wherein at least one spike tip is received within said protective element. The protective element may take the form of a layer, a rail or a pad, preferably comprising a foamed material such as PVC foam. A single protective layer may receive all spike tips. Alternatively, an individual protective pad may be provided for each spike tip or for a group of spike tips. Advantageously, the protective element is the uppermost item before the vacuum foil. Such protective element has the benefit of protecting the subsequently laid out vacuum foil from the possibly sharp tips of the spikes. It was also found to help distributing the clamping force throughout the layup stack.

In a typical embodiment, the method further comprises a step of laying out a vacuum foil on top of the uppermost fiber ply or on top of the protective element after step c), but prior to step d), wherein step d) comprises the application of vacuum to contact the fiber plies with the polymer material. In another embodiment, steps a) to c) are carried out followed by a step of placing one or more protective elements, such as a protective layer, on top of the uppermost fiber ply, wherein at least one spike tip is received within said protective element, followed by a step of laying out a vacuum foil on top of the protective element, followed by step d), wherein step d) comprises the application of vacuum, preferably vacuum assisted transfer molding, to contact the fiber plies with the polymer material. In such embodiments, the spike length advantageously exceeds the thickness of the stacked fiber plies, but does not extend to the vacuum foil.

According to one embodiment, the protective element is a protective layer. According to another embodiment, the protective layer comprises a foamed material, preferably PVC foam. In another embodiment, the protective layer consists of a foamed material, preferably PVC foam.

According to another embodiment, the method further comprises a step of applying a gel coat or primer to the molding cavity after step b), but prior to step c).

According to one embodiment, the method further comprises a step of demolding the shell part after step d), wherein the resulting shell part comprises the fastening element as an embedded part. In other embodiments, the method may comprise a step of demolding the shell part after step d), peeling off the support layer and/or the adhesive backing layer, wherein the resulting shell part comprises the spikes as embedded parts. The area where the support layer and/or adhesive layer was placed during molding may be ground as a part of a post-molding procedure, wherein the edges are overlaminated.

According to another embodiment, the fastening element further comprises an adhesive backing layer fastened to the lower face of the support layer, wherein in step b) attaching is achieved by adhesion of the backing layer to the molding surface.

Advantageously, each spike protrudes normally from the upper face of the backing layer. In other words, each spike is perpendicular to the upper face of the backing layer in this embodiment.

According to one embodiment, the support layer has a thickness of between 1 and 5 mm. More preferably, the support layer has a thickness of between 2 and 4 mm, such as between 2 and 3 mm. Such relatively low thickness has been found to result in a particular efficient molding and post-molding procedure.

According to another embodiment, the support layer has a width of between 20 and 40 mm, such as between 25 and 35 mm. According to another embodiment, the support layer has a length of at least 5 m, such as at least 10 m, preferably at least 15 m, most preferably a length that corresponds to the longitudinal distance between the root end of the blade and the position of maximum chord length. Preferably, the spikes are evenly spaced on the support layer.

In a typical embodiment, the molding cavity comprises a substantially semi-circular cross section at its root end. In the region close to the root end of the molding cavity having a semi-circular cross section, fiber ply sagging and wrinkle formation is more often seen than in regions closer to the tip end. This is due to the steeper slopes of the molding surface, which can be vertical. Particularly in this region, the method of the present invention was found to overcome these problems.

According to another embodiment, the fastening element is attached onto the molding surface within a region between the root end of the molding cavity and the position of maximum chord length, preferably within a region between the root end of the molding cavity and 15 m from the root end as seen in the longitudinal direction of the molding cavity, such as between the root end of the molding cavity and 10 m from the root end, as seen in the longitudinal direction of the molding cavity.

The polymer material may comprise a material selected from an epoxy, vinyl ester or polyester material.

In another aspect, the present invention relates to a shell part of a wind turbine blade obtainable by the method of the present invention. Typically, the shell part will be a shell half. Usually said shell part will comprise at least the spikes, in other embodiments the entire fastening elements, as permanently embedded parts.

In yet another aspect, the present invention relates to a fastening element for use in a method according to the present invention, the fastening element comprising a support layer with an upper face and a lower face, and one or more spikes protruding from the upper face of the support layer, each spike comprising a spike tip, the fastening element further comprising an adhesive backing layer fastened to the lower face of the support layer.

The fastening element may comprise a plurality of spikes, such as more than five spikes, more than ten spikes, or more than 15 spikes. Usually, the spikes will be spaced regularly on the support layer.

DETAILED DESCRIPTION OF THE INVENTION

Figure 2:
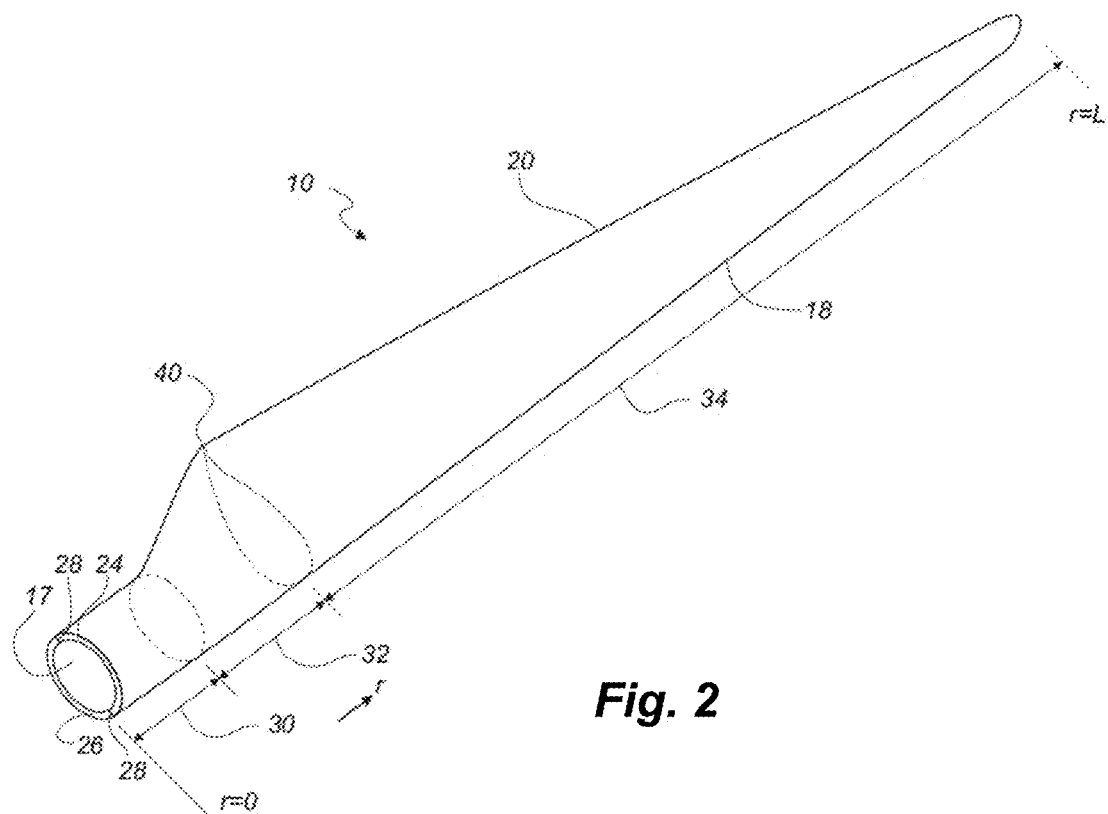
Figure 3:
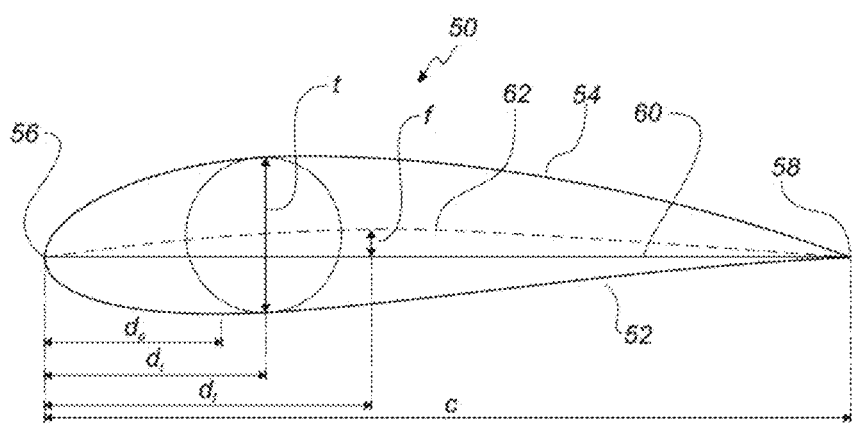
Figure 4:
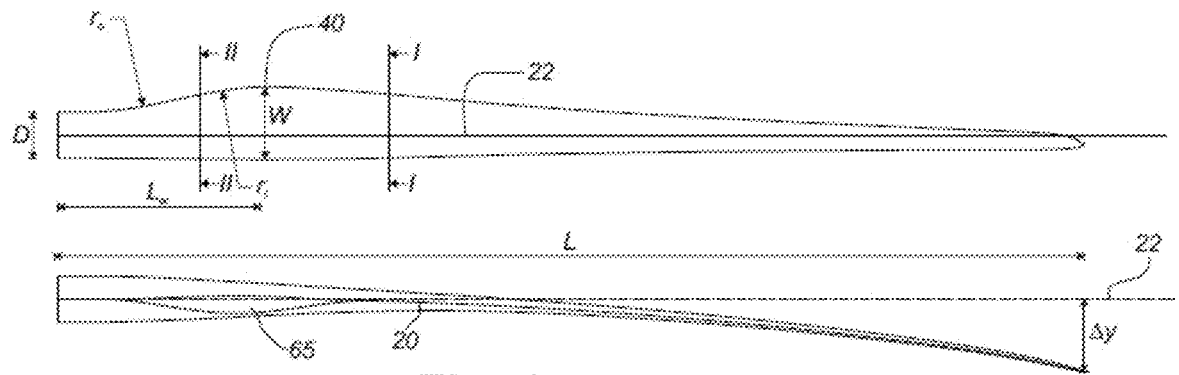
Figure 5:
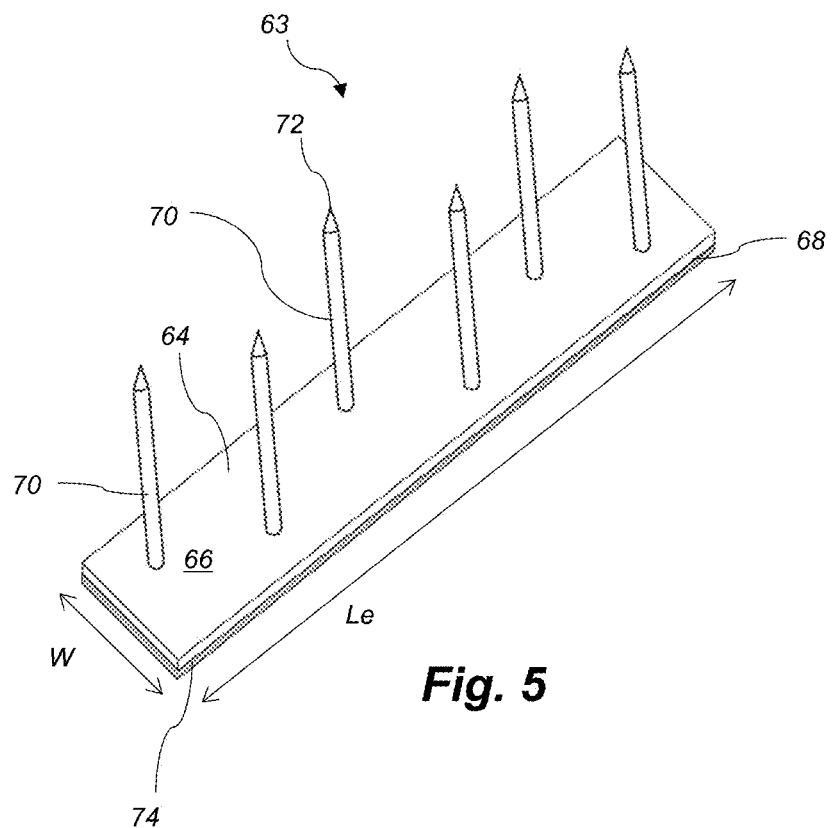
Figure 6:
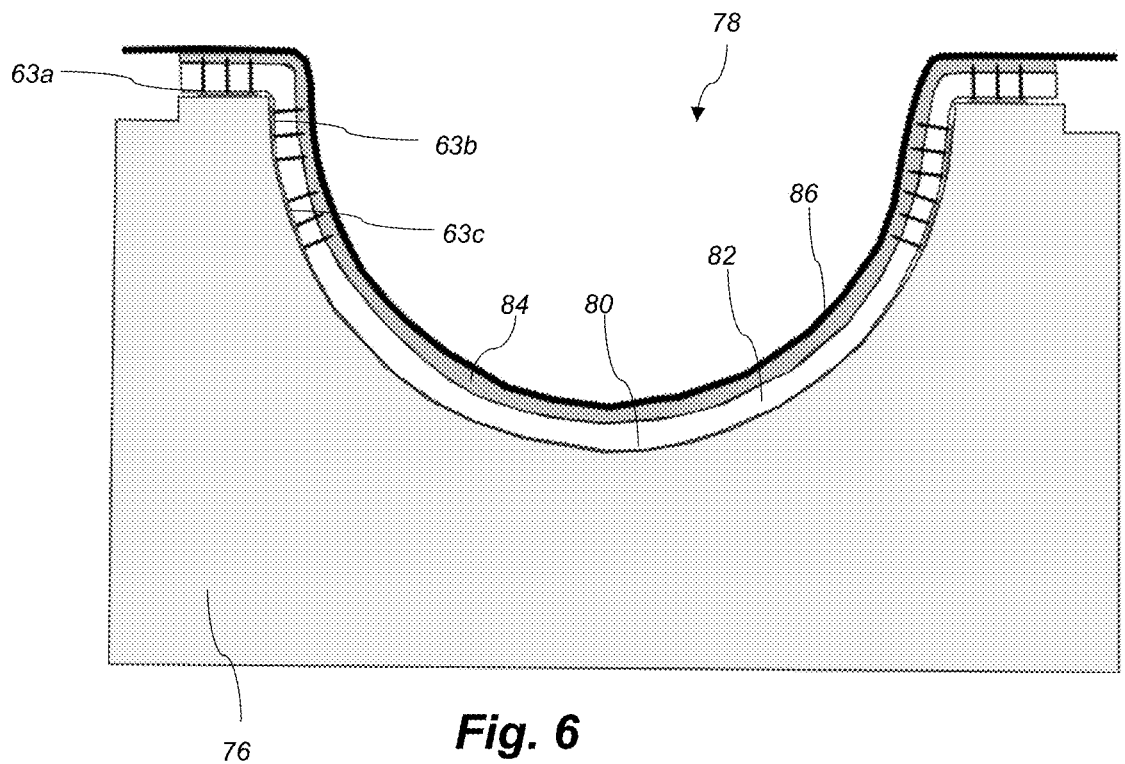
Figure 7:
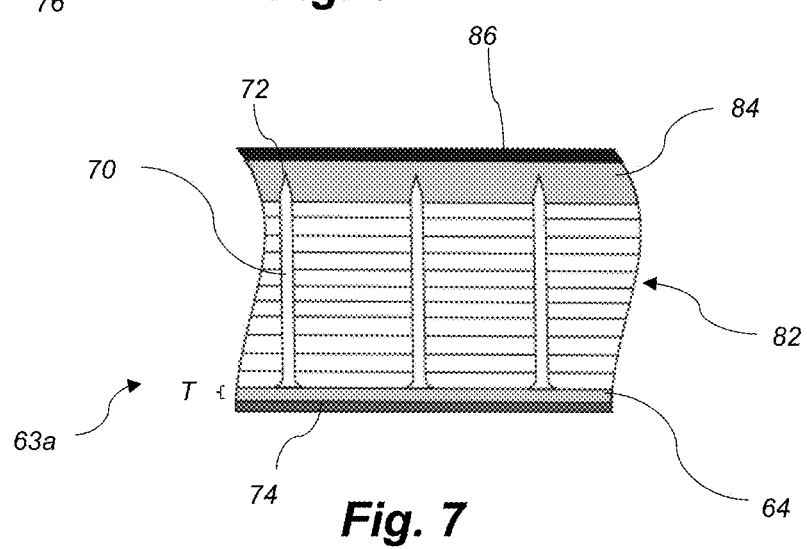

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 shows a perspective drawing of a fastening element according to the present invention, FIG. 6 is a cross sectional view of a molding structure illustrating the method of the present invention, and FIG. 7 is a close-up view of a section of FIG. 6.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

The blade 10 typically comprises a shell part, which may comprise two shell parts, e.g. a pressure side or upwind side shell part 24 and a suction side or downwind side shell part 26, which are glued to each other along bond lines, e.g. located at the trailing edge and the leading edge of the blade 10.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIG. 5 is a perspective drawing of a fastening element 63 according to the present invention. The fastening element 63 comprises a support layer 64 with an upper face 66 and an opposing lower face 68. A number of spikes 70 protrude substantially normally from the upper face 66, each spike having a spike tip 72. Attached to the support layer 64 is an adhesive backing layer 74 for attaching the fastening element 63 to a molding surface. The width W of the support layer 64 is preferably about 25-35 mm. The height H of the support layer (see FIG. 7) is preferably about 1-2 mm.

FIG. 6 shows a mold structure 76 having a molding cavity 78 with a molding surface 80. The cross sectional view of FIG. 6 is taken close to the root end of the molding cavity, which is substantially semi-circular in cross section. Several fastening elements 63a, 63b, 63c are attached to the molding surface 80. A series of fibre plies 82 is anchored to the spikes 70 as illustrated in the close-up view of FIG. 7. The latter shows an enlargement of the fastening element 63a in the upper left corner of FIG. 6. A protective layer 84 made from PVC foam is place on top of the fiber plies 82, wherein the spike tips 72 are received within the protective layer 84. A vacuum bag 86 is laid out on top of the protective layer 84 to allow polymeric resin to be drawn into the structure to contact the fiber plies with the resin.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
63 fastening element
64 support layer
66 upper face of support layer
68 lower face of support layer
70 spike
72 spike tip
74 adhesive backing layer
76 mold structure
78 molding cavity
80 molding surface
82 fiber plies
84 protective layer
86 vacuum foil
T thickness of support layer
W width of support layer
Le length of support layer
c chord length
$d_t$ position of maximum thickness
$d_f$ position of maximum camber
$d_p$ position of maximum pressure side camber
f camber
L blade length
r local radius, radial distance from blade root
t thickness
Δy prebend

The invention claimed is:

1. A method of molding a shell part of a wind turbine blade, the blade (10) having a profiled contour including a pressure side and a suction side, and a leading edge (18) and a trailing edge (20) with a chord having a chord length extending therebetween, the wind turbine blade (10) extending in a spanwise direction between a root end (16) and a tip end (14), said method comprising:
   a) providing a mold structure (76) having a molding cavity (78) with a molding surface (80), the molding cavity (78) having a root end and an opposing tip end;
   b) attaching one or more fastening elements (63) onto said molding surface, each fastening element (63) comprising a support layer (64) with an upper face (66) and a lower face (68), and one or more spikes protruding from the upper face of the support layer (64), each spike (70) comprising a spike tip (72);
   c) successively laying out one or more fiber plies (82) into the molding cavity (78) such that each ply is anchored to one or more of said spikes; and
   d) contacting said one or more fiber plies with a polymer material, and optionally curing said polymer material, to produce a shell part comprising a fiber reinforced composite material.

2. The method according to claim 1, wherein the method further comprises a step of placing one or more protective elements (84) on top of the uppermost fiber ply subsequent to step c), but prior to step d), wherein at least one spike tip (72) is received within said protective element.

3. The method according to claim 1, wherein the method further comprises a step of laying out a vacuum foil (86) on top of the uppermost fiber ply or on top of the protective element (84) subsequent to step c), but prior to step d), wherein step d) comprises the application of vacuum to contact the fiber plies (82) with the polymer material.

4. The method according to claim 2, wherein the protective element is a protective layer (84).

5. The method according to claim 2, wherein the protective layer comprises a foamed material.

6. The method according to claim 1, wherein the method further comprises a step of applying a gel coat or primer to the molding cavity (78) after step b), but prior to step c).

7. The method according to claim 1, wherein the method further comprises a step of demolding the shell part after step d), wherein the resulting shell part comprises the fastening element (63) as an embedded part.

8. The method according to claim 1, wherein the fastening element (63) further comprises an adhesive backing layer (64) fastened to the lower face (68) of the support layer (64), wherein in step b) attaching is achieved by adhesion of the backing layer (64) to the molding surface (80).

9. The method according to claim 1, wherein each spike (70) protrudes normally from the upper face of the backing layer.

10. The method according to claim 1, wherein the support layer (64) has a thickness (T) of between 1 and 5 mm.

11. The method according to claim 1, wherein the support layer (64) has a width (W) of between 20 and 40 mm.

12. The method according to claim 1, wherein the support layer (64) has a length (Le) of at least 10 m.

13. The method according to claim 1, wherein the fastening element (63) is attached onto the molding surface within a region between the root end of the molding cavity (78) and the position of maximum chord length.

14. A shell part of a wind turbine blade made by the method of claim 1.

15. A fastening element (63) for use in the method of claim 1, the fastening element comprising a support layer (64) with an upper face (66) and a lower face (68), and one or more spikes (70) protruding from the upper face of the support layer (64), each spike comprising a spike tip (72), the fastening element (63) further comprising an adhesive backing layer fastened to the lower face of the support layer (64).

16. The method according to claim 5, wherein the protective layer comprises PVC foam.

17. The method according to claim 12, wherein the support layer (64) has a length (Le) of at least 15 m.

18. The method according to claim 1, wherein the support layer (64) has a length (Le) that corresponds to the longitudinal distance between the root end of the blade and the position of maximum chord length.

19. The method according to claim 13, wherein the fastening element (63) is attached onto the molding surface within a region between the root end of the molding cavity (78) and 15 m from the root end, as seen in the longitudinal direction of the molding cavity (78).

\* \* \* \* \*